United States Patent [19]

Inoue et al.

[11] Patent Number: 5,027,301
[45] Date of Patent: Jun. 25, 1991

[54] RETRACTABLE HEAD LAMP DEVICE AND A METHOD FOR ASSEMBLING THE SAME

[75] Inventors: Katsura Inoue, Nagoya; Kenichi Fukura, Toyota; Masakatsu Tajima, Toyota; Toru Iwamura, Toyota; Masatoshi Ohshiro, Toyota, all of Japan

[73] Assignee: Aisin Seiki Kabushiki Kaisha, Japan

[21] Appl. No.: 533,136

[22] Filed: Jun. 7, 1990

[30] Foreign Application Priority Data

Jun. 12, 1989 [JP] Japan .................................. 1-148773

[51] Int. Cl.⁵ ................................................ B60Q 1/06
[52] U.S. Cl. .......................................... 362/66; 362/70
[58] Field of Search .................... 362/66, 70, 269, 272, 362/286, 287, 428

[56] References Cited

U.S. PATENT DOCUMENTS

| 4,437,143 | 3/1984 | Hayashi et al. | 362/66 X |
| 4,796,164 | 1/1989 | Fukura et al. | 362/66 |
| 4,940,281 | 7/1990 | Komatsu | 362/70 X |

FOREIGN PATENT DOCUMENTS 63-36978 2/1988 Japan .

Primary Examiner—Stephen F. Husar
Attorney, Agent, or Firm—Finnegan, Henderson, Farabow, Garrett & Dunner

[57] ABSTRACT

The retractable head lamp device includes a fixed bracket for fixing the device to the vehicle body, a movable bracket having a head lamp for positioning the head lamp between the retracted and projected positions, a drive mechanism having a motor to rotate the movable bracket relative to the fixed bracket. The device further includes a stopper member to define the retracted position of the movable bracket. The stopper member includes a threaded hole and the movable bracket includes a hole corresponding to the threaded hole of the stopper member for inserting a bolt into the holes to fix the relative position thereof during adjusting the relative position between the movable bracket and the drive mechanism so that the lines between the head lamp cover and the outer surface of the vehicle hood may be in a line.

6 Claims, 4 Drawing Sheets

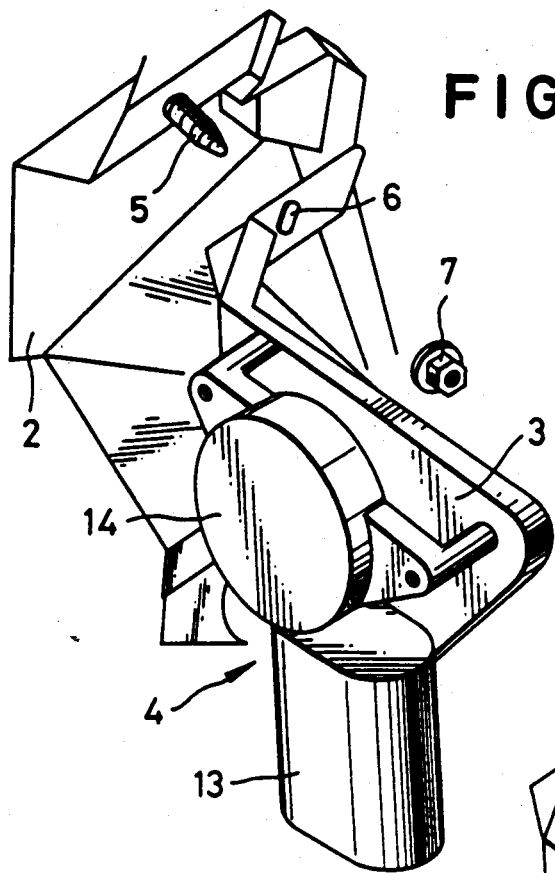
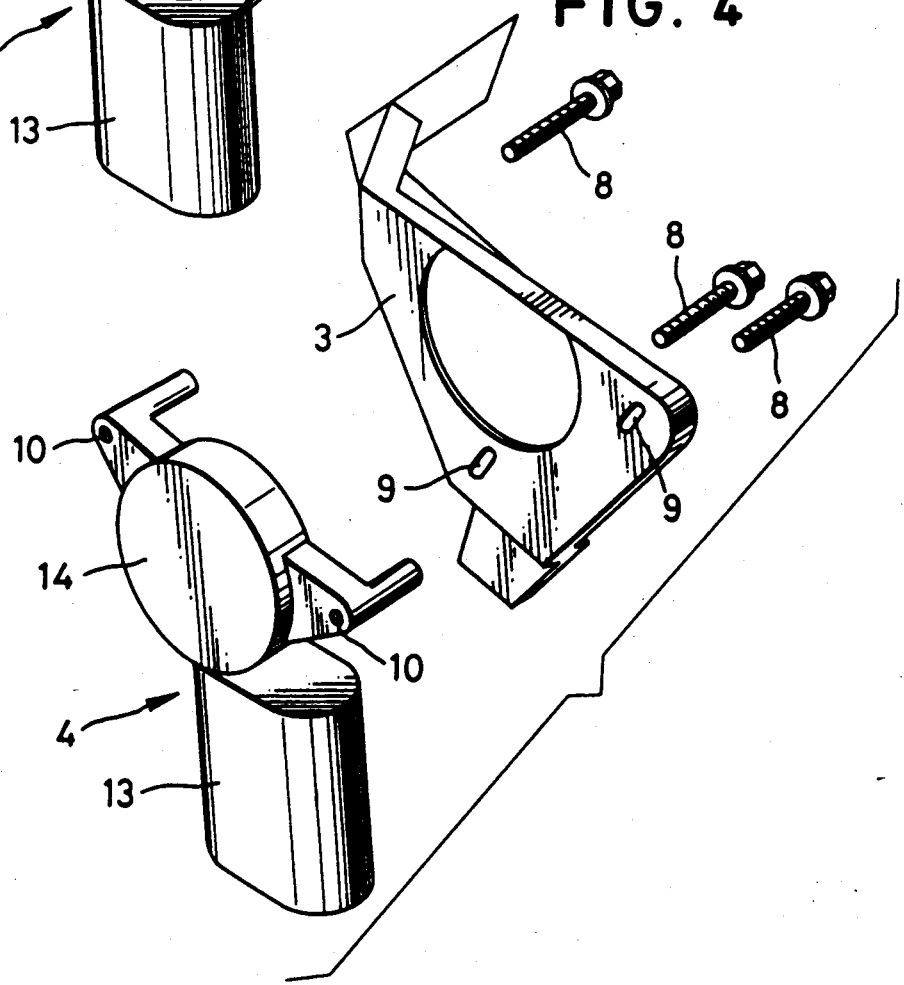

RETRACTABLE HEAD LAMP DEVICE AND A METHOD FOR ASSEMBLING THE SAME

BACKGROUND OF THE INVENTION

This invention relates to a retractable head lamp device and a method of assembling the same, which is one for use in an automobile.

One of the conventional retractable head lamp devices is disclosed in a Japanese Patent Laid Open Publication No. 36978/1988.

In this type of the retractable head lamp device, the outer surface of a hood should be in line with the outer surface of a retractable lamp cover. A disorder sometimes happens because the movable and the fixed brackets are connected through arm and rod of the drive structure under the movable bracket being still freely movable to the fixed bracket, and therefore, it requires a strict tolerance of arm and rod of the drive structure which is operatively connected to the movable bracket.

SUMMARY OF THE INVENTION

Accordingly, it is an object of the present invention to provide an improved retractable head lamp device which obviates the above conventional drawbacks. It is another object of the invention to provide an improved retractable head lamp device in which the outer surface contour of the hood of automobile is in line with or flush with that of the cove for the retractable head lamp device.

It is a further object of the present invention to provide an improved assembly method for the retractable head lamp device.

According to the present invention, the retractable head lamp device includes a fixed bracket for fixing the device to the vehicle body, a movable bracket having a head lamp for positioning the head lamp between the retracted and projected positions, a drive mechanism having a motor to rotate the movable bracket relative to the fixed bracket. The device further includes a stopper member to define the retracted position of the movable bracket. The stopper member includes a threaded hole and the movable bracket includes a hole corresponding to the threaded hole of the stopper member for inserting a bolt into the holes to fix the relative position thereof during adjusting the relative position between the movable bracket and the drive mechanism so that the lines or outlines between the head lamp cover and the outer surface of the vehicle hood may be in a line. Other features and advantages of the present invention will be apparent from the following description taken in conjunction with the accompanying drawings.

BRIEF DESCRIPTION OF THE DRAWINGS

FIG. 3 shows a perspective view of the movable bracket and drive structure being assembled;

FIG. 4 shows an exploded view of drive structure and a bracket for the drive structure;

DESCRIPTION OF THE PREFERRED EMBODIMENT

Figure 1:
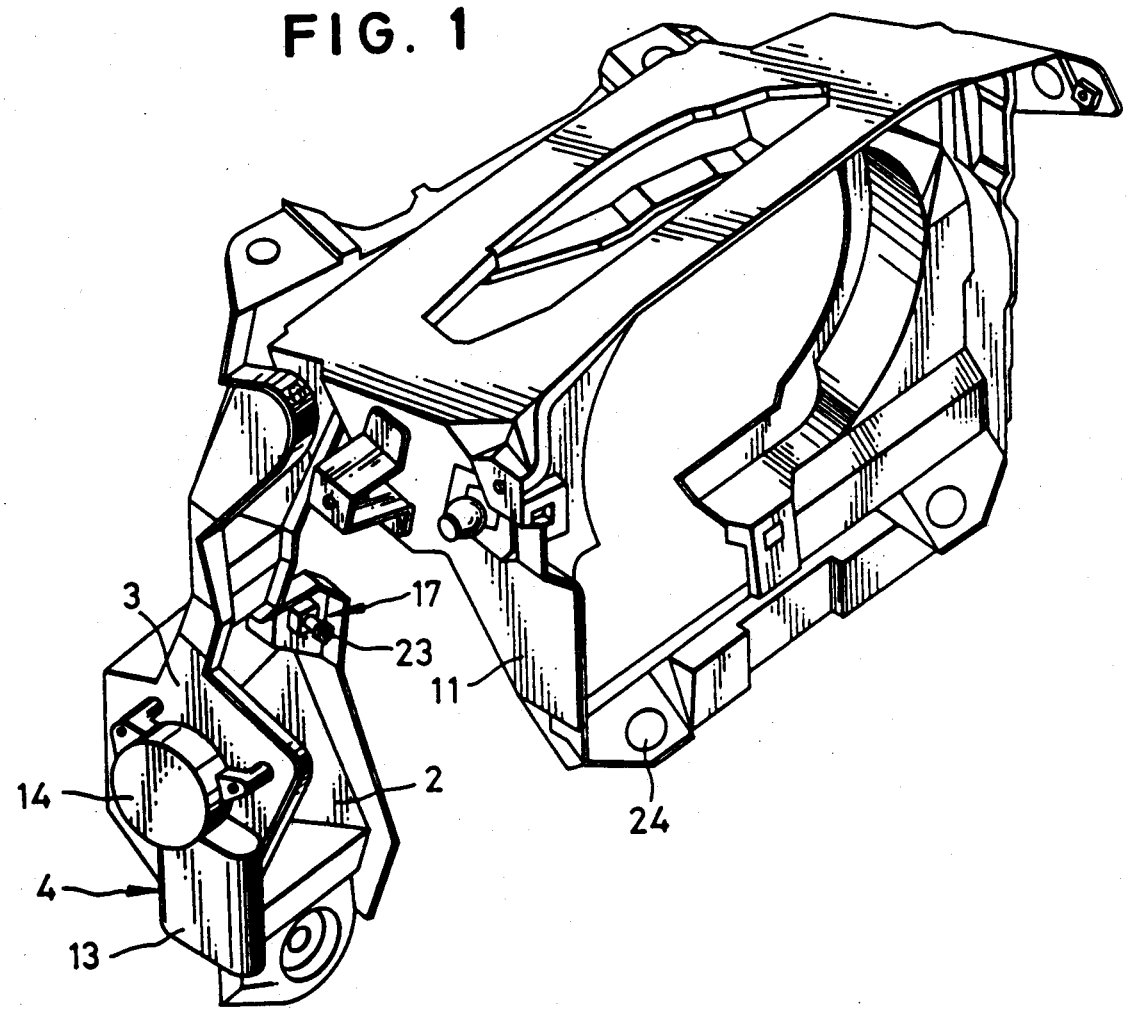
FIG. 1 shows a perspective view of the retractable head lamp device according to the present invention.

Referring now to the attached drawings, a fixed bracket 2 is secured to a vehicle body 1 (FIG. 2) and a drive structure or mechanism 4 is connected to the bracket 2 through additional bracket 3. In more detail, the bracket 3 for supporting the drive structure 4 is attached to the bracket 2 by inserting a bolt 5 provided on the bracket 2 into a slot 6 provided on the bracket 3 and fastening a nut 7 to the bolt 5. Further, the drive structure 4 is attached to the bracket 3 by inserting bolts 8 into slots 9 provided on the bracket 3 and then into threaded holes 10 provided on the drive structure 4 to engage the bolts with the threaded holes 10.

Figure 2:
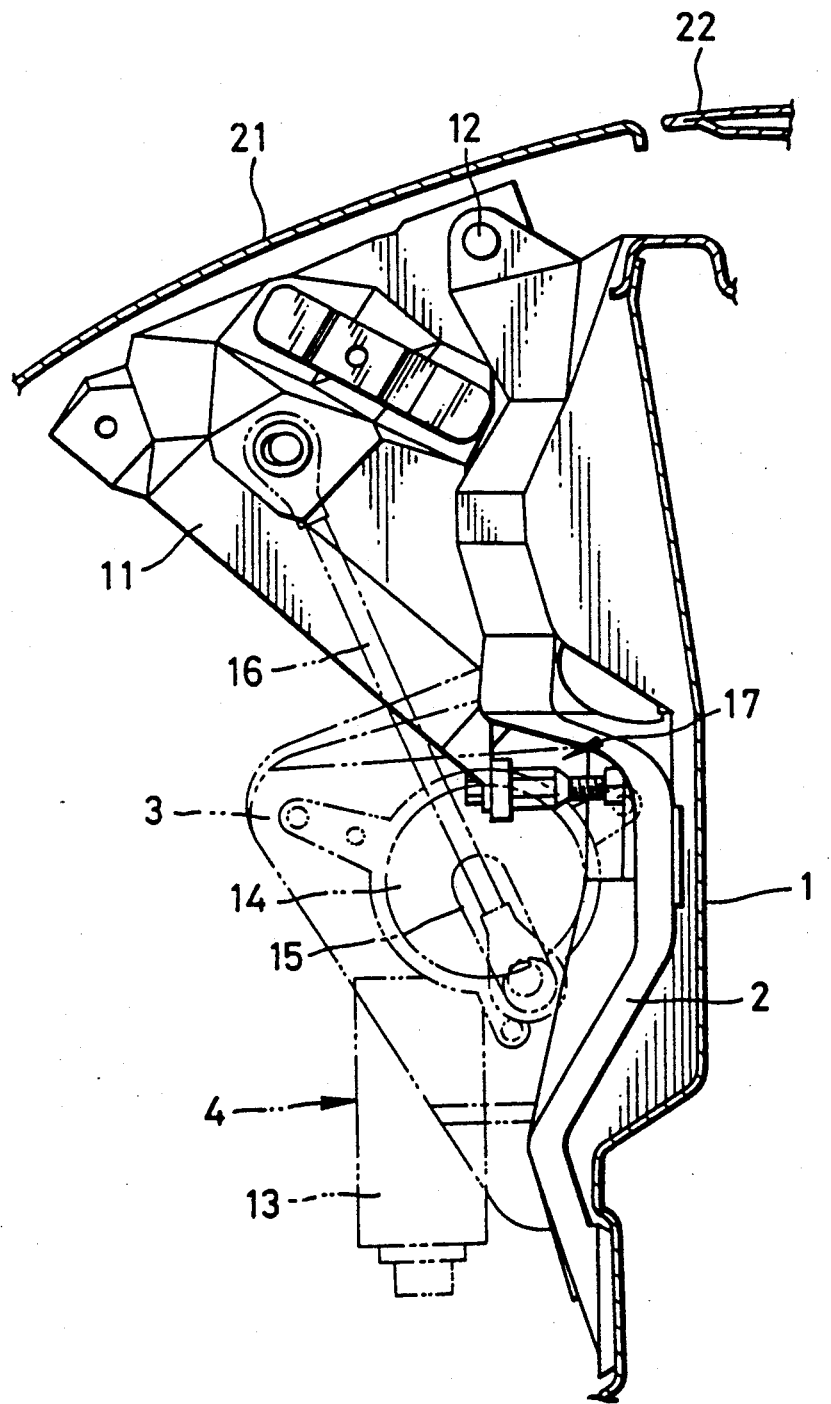
FIG. 2 shows a movable bracket and a fixed bracket of the present invention being assembled.
Figure 5:
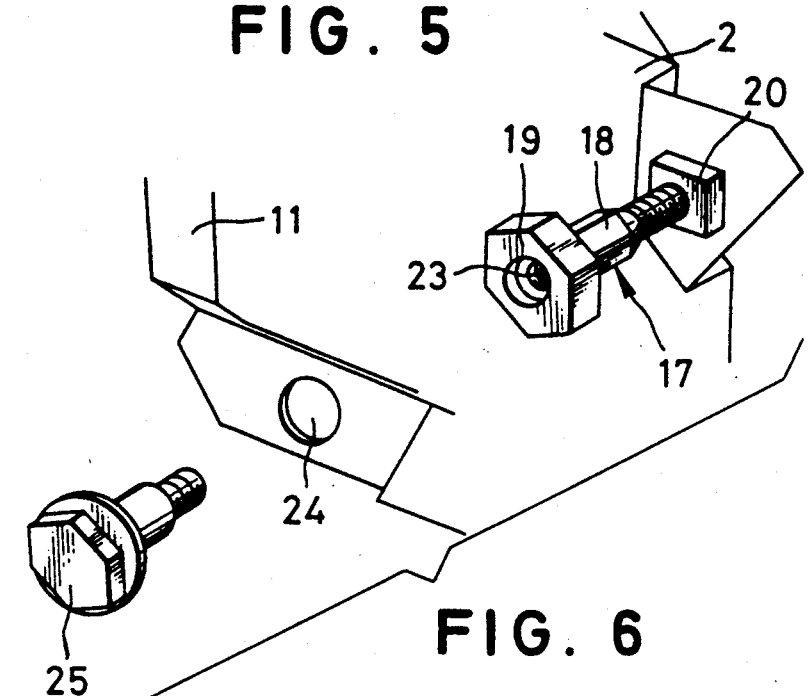
FIG. 5 shows an exploded view of bolt, movable bracket and stopper means.
Figure 6:
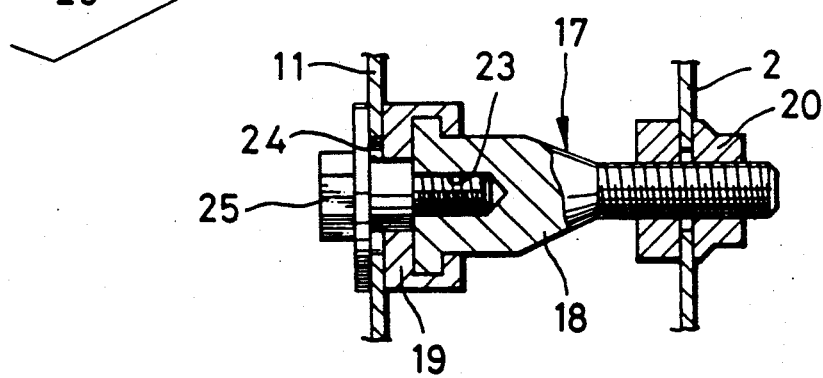
FIG. 6 shows a cross sectional view of stopper means and related parts of FIG. 5.
Figure 7:
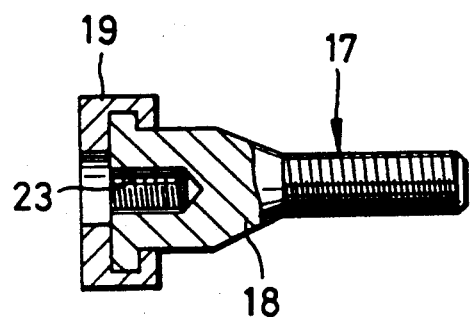
FIG. 7 shows a cross sectional view of stopper means.
Figure 8:
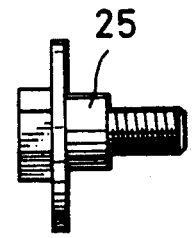
FIG. 8 shows a plan view of bolt.

A movable bracket 11 is rotatably mounted on the bracket 2 through pin 12 as seen in FIG. 2, and a head lamp (not shown) is to be attached to this movable bracket 11 when assembled. The drive structure 4 includes a motor 13 and a reduction gear unit 14 connected to the motor 13. An output shaft of the drive structure 4 is connected to the movable bracket 11 through arm 15 and rod 16. A stopper 17 is provided on the fixed bracket 2 to regulate the retracted position of the head lamp by engaging it with the movable bracket 11. As is clearly shown in FIG. 5 or FIG. 6, the stopper 17 includes a bolt 18 and a flange portion 19 connected to a head of the bolt 18. The other end of the bolt 18 is threaded into a nut 20 secured to the fixed bracket 2. The retracted position of the head lamp may be adjusted by changing the threaded engagement between the bolt 18 and nut 20. Numeral 21 designates a cover for the head lamp. The cover 21 is connected to the movable bracket 11 to cover the lamp when the movable bracket 11 is in the retracted position. Numeral 22 designates a part of the vehicle hood and the outer surface profile of the hood is in line with that of the cover 21 when the head lamp is retracted.

A threaded hole is provided on the bolt 18 of the stopper 17 and the corresponding portion of the movable bracket 11 under its retracted position is provided with an inserting hole 24. Bolt 25 can be inserted into the hole 24 and also into the threaded hole 23 of the bolt 18 to connect the bracket 11 to the fixed bracket 2 when the head lamp is retracted. Thus, for example, when the retracable head lamp assembly is during delivery to the vehicle assembly line, the movable portion of the retractable head lamp assembly can be fixed to the fixed portion by engaging the bolt 25 with the stopper 17.

When the motor 13 of the drive structure 4 is driven, the movable bracket 11 with the head lamp is rotated about the pin 12 through arm 15 and rod 16. Thus the movable bracket 11 is rotated to the retracted position or operated position (the head lamp being projected above the outer surface of the hood 22).

The assembling of the retractable head lamp assembly is as follows:

First, the movable bracket 11 is fixed to the bracket 2 by means to the bolt 25 at its retracted position. Then the drive structure 4 is secured to the movable bracket 11 through constant lengths of arm 15 and rod 16. At the same time, the drive structure 4 is secured to the bracket 3 by bolts 8 and slots 9. The position of the drive structure 4 relative to the movable bracket 11 may be adjusted by the bolts 8 and slots 9 therebetween so that the cover 21 and hood 22 may be in a line under the lamp being retracted. After the drive structure 4 being assembled, the bolt 25 must be removed for relative rotation between the brackets 11 and 2.

As many apparently different embodiments of the present invention can be made without departing from the spirit and scope thereof, it is to be understood that the invention is not limited to the specific embodiment thereof except as defined in the appended claims.

What is claimed is

1. A retractable head lamp device including:
   a fixed bracket fixed to a vehicle body;
   a drive structure including motor and operating rod, the drive structure being fixed to the fixed bracket;
   a movable bracket having a head lamp therein rotatably mounted on the fixed bracket and is movable between a retracted and a projected position of the head lamp by the operation of the motor of the drive structure; and
   a stopper means for positioning the retracted position of the movable bracket, the stopper means being provided on the fixed bracket and including a bolt portion, and flange portion on which the movable bracket is engaged when the movable bracket is in the retracted position to define the retracted position thereof.

2. A retractable head lamp device according to claim 1, wherein the bolt portion of the stopper means is adjustably threaded into the fixed bracket for adjusting the retracted position of the head lamp.

3. A retractable head lamp device according to claim 1 or 2, wherein the flange portion of the stopper means includes a threaded hole and wherein the movable bracket includes a hole corresponding portion of the threaded hole of the flange portion of the stopper means.

4. A retractable head lamp device according to claim 3, wherein a bolt is inserted into the hole of the movable bracket and further threaded into the threaded hole of the stopper under retracted position thereby to fix the retractable head lamp device to the retracted position before assembling thereof.

5. A method for assembling the retractable head lamp device comprising the steps of:
   connecting a drive structure to a fixed bracket;
   rotatably engaging a movable bracket to the fixed bracket for positioning the movable bracket between a retracted and a projected position;
   inserting a bolt into a hole provided on the movable bracket under the retracted position; and,
   threading the bolt into a threaded hole provided on the fixed bracket to fix the retracted position of the movable bracket; and,
   adjusting the position of the drive structure relative to the retracted position of the movable bracket.

6. A method for assembling the retractable head lamp device according to claim 5, further comprising the step of;
   removing the bolt after the relative position between the movable bracket and the drive structure.

* * * * *